United States Patent [19]

Kjelland-Fosterud

[11] 3,742,110

[45] June 26, 1973

[54] METHOD OF SHAPING BRITTLE FOAMED CLAY BY CRUSHING WITH A BLUNT ROLLER

[75] Inventor: Einar Kjelland-Fosterud, Hosle, Norway

[73] Assignee: Sentralinstitutt for Industriell Forskning, Oslo, Norway

[22] Filed: May 13, 1971

[21] Appl. No.: 142,990

[30] Foreign Application Priority Data
May 15, 1970  Norway.............................. 1876/70

[52] U.S. Cl............................ 264/321, 83/7, 83/12, 83/30, 83/669, 83/676, 264/67, 264/156, 264/162, 264/284, 264/293
[51] Int. Cl............................................. B29d 27/00
[58] Field of Search .................. 264/42, 43, 44, 45, 264/67, 162, 284, 293, 321; 264/155, 156; 83/30, 660, 669, 676, 7, 12, 2

[56] References Cited
UNITED STATES PATENTS

| | | | |
|---|---|---|---|
| 3,448,513 | 6/1969 | Chisholm | 264/321 X |
| 3,577,507 | 5/1971 | Corbett | 264/321 |
| 3,384,696 | 5/1968 | Makansi | 264/321 |
| 3,518,334 | 6/1970 | Carrigan | 264/321 |
| 3,026,574 | 3/1962 | Takacs | 264/321 X |
| 3,574,583 | 4/1971 | Goldsmith | 264/43 X |
| 1,845,350 | 2/1932 | Slidell | 264/43 |
| 2,522,116 | 9/1950 | Hayes | 264/321 X |
| 3,418,403 | 12/1968 | Garnero | 264/43 X |
| 2,629,899 | 3/1953 | Aller | 264/321 X |
| 3,207,016 | 9/1965 | Huff | 83/12 |
| 3,538,797 | 11/1970 | Wagtskjold | 83/660 X |
| 3,665,793 | 5/1972 | Lehner | 83/2 |

Primary Examiner—Donald J. Arnold
Assistant Examiner—Paul A. Leipold
Attorney—Wenderoth, Lind & Ponack

[57] ABSTRACT

A method for forming an object of brittle foam material from foam clay or a similar ceramic building material in the form of a block or element. The objects are formed under controlled, local crushing of the foam material by pressing during the forming one or more tools into the foam material with a force that exceeds the compression strength of the foam material and with a crushing area which multiplied by the compression strength defines a lesser force than that force which causes high enough tensile stress to exceed the tensile strength of the foam material, outside the local parts of the foam material which are crushed. The crushing area is less than 5 per cent of the surface which is formed and may be performed by a number of hammers having a controlled length of stroke. The crushing may be performed by means of one or more clay cylindrical discs which are pressed into the surface of the foam material and then moving and pressing the discs again for forming slits in the material or to divide the object.

6 Claims, 4 Drawing Figures

PATENTED JUN 26 1973　　　　　　　　　　3,742,110

INVENTOR
EINAR KJELLAND-FOSTERUD
BY
*Wenderoth, Lind & Ponack*
ATTORNEYS

METHOD OF SHAPING BRITTLE FOAMED CLAY BY CRUSHING WITH A BLUNT ROLLER

This invention relates to a method for forming objects of brittle foam material, for instance a ceramic building material which may have been produced from e.g., a clay containing material, glass powder or aggregates thereof, slag, flotation waste and similar expandable material. Usually such materials are formed by means of sawing or milling tools, but the drawback attained thereto is relatively serious since the tool is soon worn against the ceramic material. The object of the invention is to make available a new method just as good as the known ones, but which is not encumbered with said drawback, in order to part blocks of a stiff, bloated material, in order to planish or plane surfaces of such blocks, to form patterns in the surfaces and to make holes in the blocks.

When a stiff, brittle foam material is exposed to local compressive strains which exceed the compression strength of the material, e.g., when a cylinder is firmly pressed into the material, the foam is crushed locally. The crushed material may remain in the pores and need not be removed. Consequently, no considerable tensions will occur in the foam material around the cylinder.

The phenomenon is due to the fact that the specific volume of the foam material can be extremely much reduced by crushing the material, in contrast to liquids and massive, solid materials, which have a high volumetric modulus of elasticity and accordingly changes its volume very little when being compressed. The phenomenon is utilized when nails are penetrated both into wood which is an elastic and tough foamlike material, and into expanded clay and light concrete which are brittle foam materials.

The phenomenon is utilized according to the present invention by forming the objects under controlled, local crushing of the foam material, during which forming one or more tools are pressed into the foam material with a force that exceeds the compression strength of the foam material and with a crushing area which multiplied by said compression strength defies a lesser force than that force which causes high enough tensile stresses to exceed the tensile strength of the foam material, outside the local parts of the foam material which are crushed.

With the above and other objects in view which will become apparent from the detailed description below, some preferred forms of the invention are shown in the drawings, in which.

Figure 1:
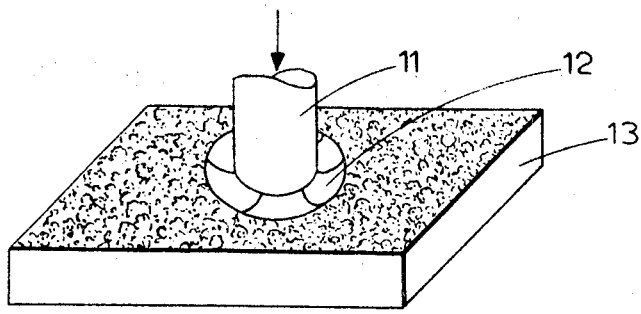
FIG. 1 is a diagrammatic view illustrating one form of tool.

FIG. 1 shows a crushing tool 11 of circular form for forming a cavity 12 in an element 13 of ceramic foam material. The tool 11 may have an arbitrary form, but it does come naturally to choose a circular, quadratic or rectangular cross section. The tool 11 may comprise a number of hammers having a controlled length of stroke, which tools are moved along the surfaces while they strike in sequence. The area of the contact surface which exists at any time between the tool 11 and the foam material shall preferably be less than 5 per cent of the area of that surface which is to be formed, to be sure that the element 13 is not destroyed.

Figures 2, 2A:
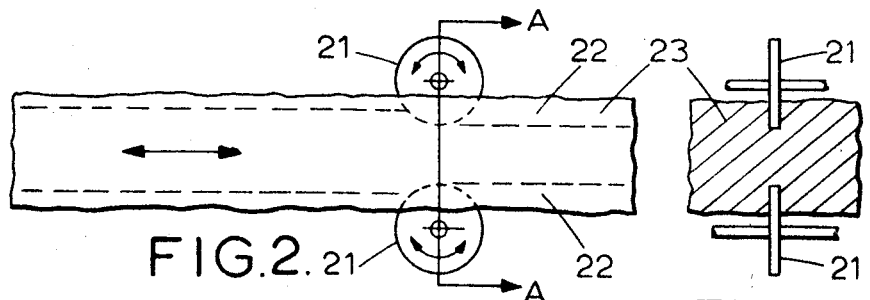
FIG. 2 is a side view illustrating another form of tool.
FIG. 2A is a cross-section taken upon section line A—A of FIG. 2.

FIG. 2 shows parting of a bloated material, by means of one or more cylindrical objects 21, for instance wheels, which are pressed down into the surface, are moved and pressed down again for forming one or more slits 22 in a block 23. The wheels 21 are pressed into the material one length at a time if the block 23 has some considerable thickness.

Additionally FIG. 2 shows a method which has revealed a possibility for forming a pattern in adjacent side surfaces of elements of brittle foam material which are to be joined, e.g., according to the principle of tongue and groove.

Figure 3:
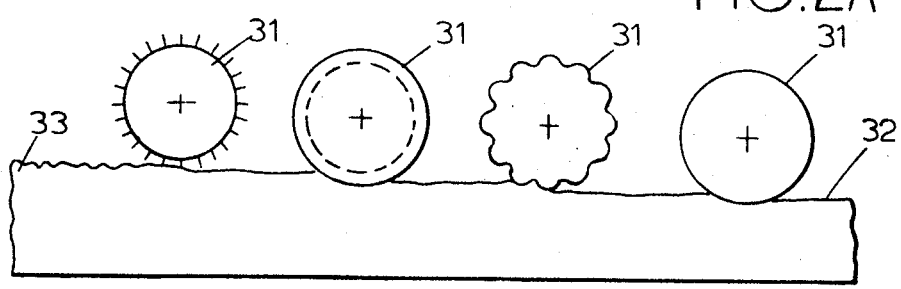
FIG. 3 is a diagrammatic view illustrating another form of tool.

FIG. 3 illustrates reduction of thickness and planing of a foam material by means of a number of circular discs or rollers 31 mounted on shafts lying parallel to the desired surface 32 of a block 33. The discs 31, which conveniently are rolled across the block 33, may be equipped with cams, teeth or spikes to reduce the contact surface against the block 33. Sliding between the tool and the foam material is not intended, since this wears unnecessarily.

Figure 4:
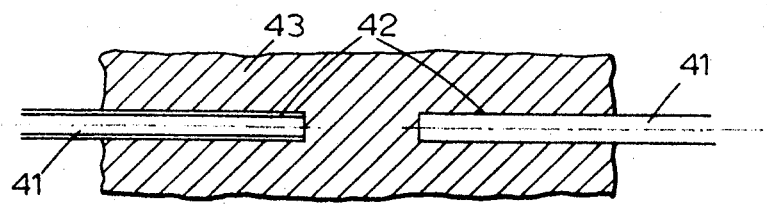
FIG. 4 is a partial cross-sectional view indicating still another form of tool.

FIG. 4 shows perforation of a foam material by means of a massive or tubular tool 41 which is pressed axially into a bloated object 43. The holes 42 can be formed in succession for dividing the object 43.

Most effective in such case, is to use a tool comprising a number of parallelly arranged rods or spikes in a row, which are repeatedly stabbed into the object, each time on a new spot and as narrow as possible to each other so that the object is finally parted by the stabbing. In some cases it is preferred to interrupt the stabbing before the object is entirely pierced, and then divide it later by cracking the remaining part. If the object has considerable thickness, it is stabbed in stages under constant movement of the tool.

If it is desired to remove the crushed material under the crushing, this can easily be performed by means of compressed air.

The method according to the invention is esspecially well suited for forming objects of foam clay.

I claim:

1. A method for shaping a brittle foamed clay material into building elements, comprising crushing the material at local parts by forcing a roller tool means having a blunt foam crushing surface a controlled depth into the material at a pressure that exceeds the compression strength of the material, causing relative movement between said material and said roller tool means without allowing sliding therebetween, said roller tool means having an active crushing area which multiplied by said compression strength defines a lesser force than that force which causes high enough tensile stress to exceed the tensile strength of the material outside the local parts of the material being crushed.

2. A method as claimed in claim 1, wherein said activ crushing area is less than 5 percent of the surface being shaped.

3. A method as claimed in claim 1, wherein said brittle foamed clay material is a ceramic material.

4. A method as claimed in claim 3, wherein said roller tool means comprises at least one cylindrical disc which after having been forced into the material is displaced and again forced into the material, and has an active crushing area which at any time is less than 5 per cent of the surface being shaped, and repeating said shaping until at least a slit has been formed in the material.

5. A method as claimed in claim 3, wherein said roller tool means comprises at least one circular and cylindrical roller which is rolled across the surface of the material, and repeating said rolling until the dimensions of the material have been uniformly reduced.

6. A method as claimed in claim 5, wherein said outranging shaping is performed by means of outranging parts of said rollers, said parts while in contact with the material defining said active crushing area which at any time is less than 5 per cent of the surface being shaped.

* * * * *